United States Patent [19]

Capol

[11] Patent Number: 4,909,591
[45] Date of Patent: Mar. 20, 1990

[54] CABLE WITH OPTICAL FIBERS FOR SIGNAL TRANSMISSION

[75] Inventor: Bruno M. G. Capol, Windisch, Switzerland

[73] Assignee: Kabelwerke Brugg AG, Brugg, Switzerland

[21] Appl. No.: 60,773

[22] Filed: Jun. 9, 1987

[30] Foreign Application Priority Data

Jun. 13, 1986 [EP] European Pat. Off. ............ 86108109

[51] Int. Cl.$^4$ .............................................. G02B 6/44
[52] U.S. Cl. ................................................ 350/96.23
[58] Field of Search ..................................... 350/96.23

[56] References Cited

U.S. PATENT DOCUMENTS

| | | | |
|---|---|---|---|
| 4,205,899 | 6/1980 | King et al. | 264/1.5 |
| 4,289,558 | 9/1981 | Eichenbaum et al. | 156/179 |
| 4,364,788 | 12/1982 | Bloodworth, Jr. et al. | 156/179 |
| 4,366,667 | 1/1983 | Oestreich | 264/1.5 |
| 4,458,476 | 7/1984 | Mayr et al. | 264/1.5 |
| 4,645,628 | 2/1987 | Gill | 264/1.5 |
| 4,781,433 | 11/1988 | Arroyo et al. | 264/1.5 |
| 4,784,462 | 11/1988 | Priaroggia | 264/1.5 |

FOREIGN PATENT DOCUMENTS

| | | | |
|---|---|---|---|
| 0543574 | 2/1985 | Australia | 350/96.23 |
| 543574 | 2/1985 | Australia . | |
| 0128765 | 12/1984 | European Pat. Off. . | |
| 2928678 | 1/1981 | Fed. Rep. of Germany . | |
| 0019026 | 11/1980 | France . | |
| 2489002 | 2/1982 | France . | |
| 2509480 | 7/1983 | France . | |
| 2534385 | 4/1984 | France . | |
| 2122767 | 1/1984 | United Kingdom . | |
| 2157018 | 10/1985 | United Kingdom . | |

OTHER PUBLICATIONS

A. Morello, "Introduction to Optical Fibre Cables", Pirelli Cable Rev. No. 26, pp. 1-6, Jul. 1985.
A. Portinari, "Design Considerations for Optical Cables", Pirelli Cable Rev. No. 26, pp. 52-55, Jul. 1985.

Primary Examiner—John D. Lee
Assistant Examiner—Akm E. Ullah
Attorney, Agent, or Firm—Marmorek, Guttman & Rubenstein

[57] ABSTRACT

The problem which has existed heretofore, of maintaining the protection of optical fibers under all circumstances from axial traction loads in cables used for the transmission of data by means of a number of signal transmitting optical fibers by means of electromagnetic radiations of wavelengths under 1 mm, essentially in the longitudinal direction of the fibers and the related problem of being able to exclude completely, even under extreme working conditions, the danger of rupture of the optical fibers during thermal expansion and very strong bending of the cable have been solved by guidance means (7, 9, 10) for the guidance of the fibers (8) on paths (12) located on the inside of at least one cylinder-jacket-shaped shell (13) and assuming an essentially wave-shaped course with excursions (52) in relation to imaginary median lines (11) attributed to each and situated inside the cylinder-jacket-shaped shell (13) in a position which is essentially parallel to the cylinder axis (53) of said shell and which are freely movable in azimuthal direction up to the transition into straight lines.

12 Claims, 2 Drawing Sheets

CABLE WITH OPTICAL FIBERS FOR SIGNAL TRANSMISSION

The instant invention relates to a cable for the transmission of data with a number of optical fibers for signal transmission with the help of electromagnetic radiations of wavelengths below 1 mm, transmitted essentially in the longitudinal sense of the fibers as well as to a process for the manufacture of this cable and to a device to carry out the process.

BACKGROUND OF THE INVENTION

Cables of this type are generally known under the designations "glass fiber cable" and "light transmission cables", both of which are not entirely correct inasmuch as the fiber material of optical fibers, although being made of glass as a rule, can however also be made of other, special plastic materials for optical fibers, and also because signal transmission through optical fibers is no longer limited to the range of visible light but extends on the one hand into the area of infrared heat radiation and on the other hand into the area of invisible ultraviolet radiation. The designation "optical fiber" which is now in general use and is also used here, is accordingly to be understood in the sense of a fiber for signal transmission by means of electromagnetic radiations transmitted in the longitudinal sense of the fibers, without any limitation to visible light as the light transmitter, as might be deducted from the term "optical".

THE PRIOR ART

Cables of the above-mentioned type, with optical fibers for the transmission of signals and the essential rquirements to be met in the design of such cables are known, as for example from the literature such as "Introduction to optical fiber cables" (Pirelli Cable Review No. 26, July 85, pages 1-6) and "Design considerations for optical cables" (Pirelli Cable Review No. 26, July 85, pages 52-56). One of the most important requirements for the design of such a cable is that the optical fibers must be protected from any kind of axial tension load as well as from extreme bending. However, these most important requirements were precisely the ones that could only be met to an insufficient degree until now or were simply not met in the known light transmission cables under certain unfavorable circumstances or when several such unfavorable circumstances, varying from cable to cable, came together, even though it does not appear to be especially difficult at first glance to meet these requirements of complete protection of the optical fibers from axial tension loads and extreme bending because axial tension loads for instance are or seem to be preventable by a helical course of the optical fibers or a stranding of the cable and extreme bending by an appropriate armoring of the cable.

Closer investigation shows however that the originally planned helical course of the glass fiber cable does not provide sufficient protection of the fibers from axial tension load because with such a course, although in the presence of curvatures in the cable the shifting of fiber segments which are on the inside of the curvature to the outside of the curvature results in a compensation of length and although the axial tension load of the fibers, when the cable is bent, is limited to the tension loads which are required for this shift and which are generally relatively small, axial tension loads affecting the fibers occur as a rule when thermal expansion of the cable takes place, such as for instance as a result of sun irradiation upon an outdoor cable, capable of bringing about a rupture of the fibers because the thermal expansion coefficient of glass is known to be extremely low and because the thermal expansion coefficient of the entire cable is therefore as a rule considerably higher than the thermal expansion coefficient of the fibers; this results, when thermal expansion of the cable occurs, in axial elongation of the helical line of the course of the fibers and would therefore require a decrease of the diameter of the cylinder on which the helical line runs in function of this axial elongation, less the minimal fiber elongation resulting from the thermal expansion of the fibers, whereas such a decrease of the diameter is not possible because the guidance means provided inside the cable to guide the fibers in a helical course support the fibers radially and thereby render impossible a shifting of the fibers towards the center of the cable, and furthermore because of the thermal expansion of the cable which naturally takes place in the transversal direction of the cable and not only in its longitudinal sense, actually causing a shifting of the fibers away from the center of the cable and therefore an increase of the diameter of the cylinder on which the helical line takes its course, thereby forcing an elongation of the fibers which exceeds their upper breaking elongation limits and thus causing their rupture.

Neither can the danger of fiber breakage due to thermal cable expansion be eliminated by providing a helical course of the fibers with periodically alternating sense of twist along the cable instead of a helical course of the fibers with a sense of twist remaining constant over the entire length of the cable, according to the so-called false-twist method. For even when the fibers take such a course, axial elongation of the helical line with periodically alternating sense of twist results naturally from thermal cable expansion, provoking a tendency for a decrease in diameter of the cylinder on which the helical line with periodic alternating sense of twist takes its course, as a shift of the ranges of the alternation of the sense of twist of the helical line in the circumferential sense of the cable is impossible because of the guidance means which are naturally also required when the course of the fibers is helical with periodically alternating sense of twist, and because the guidance means support the fibers radially in the same way as with a helical course with constant sense of twist the above-mentioned shrinking tendency of the diameter of the cylinder on which the helical line with periodically alternating sense of twist runs leads to a rupture of the fibers, just as is the case with a helical course of the fibers with constant sense of twist.

The theoretically possible utilization of materials with different expansion coefficients for the optical fibers in order to prevent the danger of fiber rupture as a result of thermal expansion of the cable is not possible in practice for a number of different reasons. The main reason is first of all that no material with a higher expansion coefficient and suitable for optical fibers is known. But even if such materials were known, the danger of fiber rupture could be avoided through the utilization of a fiber material with different expansion coefficients only if the expansion coefficients of the fiber material and of the entire cable at least nearly coincided, and to obtain such a coincidence is not possible in practice because the expansion coefficient of the entire cable can be vary greatly, depending on the composition of the cable and on each of the materials used in the cable, and because with a relatively high expansion coefficients of a fiber material and the expansion coefficients of a cable being relatively low, a considerable difference in expansion coefficients would again result which, in this case, would lead to a rupture of the fibers not when the cable is heated excessively, but rather when it is cooling down to a great degree.

Thus, with the fibers following a helical course, the danger of fiber rupture cannot be reliably eliminated either with a constant nor with a periodically alternating sense of twist of the helical line because the requirement for the protection of the optical fibers from axial tension loads cannot be met with this stranding principle of design, in any case not if the cable is exposed to relatively high temperature stresses, such as for example the operating temperature range of −40° C. to +70° C. prescribed for outdoor cables.

There exist therefore relatively narrow limits for admissible temperature ranges for stranded cables with optical fibers already in operation or on the market, limits that can be observed in practice only with cables running underground, and furthermore the optical fibers in stranded cables, in addition to severe temperature conditions, would have to be running loosely in relatively hard tubes so that the earlier-mentioned shifting of the fiber segments which are on the inside of the curvature towards the outside of the curvature may take place for the sake of length compensation when the cable is bent, without imposing great tension loads upon the fibers as would be the case in the absence of these relatively hard tubes if the fibers were to be held back by internal pressure of the cable and if said shifting could therefore only occur in opposition to considerable friction resistance. Since the hard tubes must resist all possible internal cable pressures during operation and when the cable is laid, and furthermore must be provided with a sliding layer made of a high-resistance smooth synthetic material, e.g. nylon to avoid a so-called micro-bending of the fibers against rough surfaces on the inside of the tube wall, the manufacture of these relatively hard small pipes is extremely costly, so that stranded cables with optical fibers, in addition to the disadvantage of low temperature tolerances, have the disadvantage of being very expensive to make.

It is obvious that these decisive disadvantages of the stranding design principle in cables with optical fibers had to lead to attempts to meet the requirement of complete protection of the optical fibers from axial tension loads and extreme bending by applying other design principles to the building-up of cables with optical fibers. Thus, for example, the British patent application GB-A 2,122,767 proposed to imbed the optical fibers along a wavy course in rubber and to combine a number of such rubbers with fibers running along a wave-shaped course into one package and to twist the latter too, if necessary. This proposal was not sufficiently thought through however, because a wave-shaped fiber course would only make sense if a fiber could go over into a straight-line or nearly straight-line state without difficulty, i.e. without axial tension loads, and in order to achieve such a straight-line course the fibers imbedded in rubber along a wavy course would have to cut through the rubber in the plane of the wave-shaped course, and such cutting would of course (if at all) be possible only with extraordinarily high tension loads being applied, whereby the fibers would as a rule break before these are reached. This can be seen easily if one attempts to cut through a soft eraser with a tensions steel wire (without moving the rubber back and forth in the axial direction of the wire), for in such a test the rubber is not cut but the steel wire tears. Aside from this, with the layout according to the above-mentioned British application, the space required per fiber, being approximately 1000 times the volume of the fiber, is definitely excessive. For exactly the same reason as with GB-A 2,122,767, also with the proposal according to GB-A 2,157,018 to introduce the optical fibers into wave-shaped grooves of a band being wave-shaped in longitudinal direction of the cable and to wrap the band then round a cable core and to fix it on the cable by a foil-band applied helically on the wrapped band and to enclose the whole with an outer protective covering serving as cable sheathing, the wave-shaped course of the fibers makes practically no sense, for also with this GB-A 2,157,018, the optical fibers cannot change into a straight-lined state because the wave-form of the grooves remains also with an extension of the cable, i.e. maxima and minima of the wave-shaped course of the grooves remain on invariable angular positions relatively to the cable core with any extension of the cable. A proposal similar to the proposals according to the GB-A 2,122,767 and GB-A 2,157,018 contained in the French patent application FR-A 2,509,480 also provides for a wave-shaped course of the fibers, whereby each individual fiber is located in a kind of flat pipe with two flat pipe wall sections facing each other and with two half-round pipe wall section also facing each other and connecting these flat pipe wall sections to each other. Although in this arrangement the fiber is able to go over from its wave-shaped course to a straight-line course, in contrast with the arrangement according to GB-A 2,122,767 and GB-A 2,157,018, without any axial tension load for as long as the flat pipe or pipes are still straight, this state exists practically only during the manufacture of the cable; for upon completion of the manufacturing process it is already wound up on a cable roll, and it must be then be possible for the flat pipes to be bent together. with the cable so that for that reason they may not be so hard as to break when bent in this manner. The flat pipes must therefore be made of a flexible material, and if this is the case, they will be flattened within their elastic range of deformation in the areas of curvature of the cable because flat pipes, as is known, are less stable than cylindrical pipes when subjected to outside pressures. This flattening within the elastic range of deformation does disappear again as soon as the cable is laid out in a straight line, but occurs again at points where the cable must be laid in a curve or bent, and as a result of this flattening the fibers following a wave-shaped course within the flat pipes are retained or held by pressure in the curvature zone of the cable between the flat pipe wall parts, so that the length compensation which is required precisely in the areas of cable curvature between the fibers at the inside of the curve and the fibers at the outside of the curves cannot take place, or so that said passage of the fibers from a wave-shaped course into a straight-line course is hindered or even rendered impossible and in any case entails considerable axial tension loads acting upon the fibers, capable of bringing about a breaking of the fibers taking this wave-shaped course in case of marked flattening of the flat pipes or if the fibers following a wave-shaped course inside these pipes are completely held fast through pressure, i.e. in the areas of marked cable curvature. Neither the proposal according to the above-mentioned British application, nor the proposal according to the preceding French application is therefore able to meet the requirements ensuring protection of the optical fibers under all circumstances from tension loads and thereby from the danger of breaking and this also applies to all other proposals which have become known in this respect. Thus, for example, a proposal according to the French patent application FR-A 2,534,385 provides an essentially cylindrical holding device made of a thermoplastic material for each individual fiber and surrounding said fiber, said holding device being provided with a slit extending across approximately 85% of its diameter and thus dividing the holding device into nearly two half cylinders to receive the fibers and being provided with two reinforcing wires, but in this proposal too, just as with the flat pipes discussed earlier, the danger exists that the holding device may be flattened or that the slit may be pressed together, thus causing the fibers to be pinched in the slit, which could then result in a tearing of the fibers in the areas of curvature of the holding device. It is true that this danger of the slit being pressed together with one single such holding device does not exist because the two reinforcement wires only permit bending of the holding device that exclude compression of the slit, but a cable with optical fibers not only contains one single, but several optical fibers as a rule and would accordingly also have to contain a plurality of such holding devices for the individual fibers, and then the internal pressures within the cable which cause such a compression of the slits, especially in the areas of curvature of the cable, could no longer be avoided. Also different other published proposals for the meeting of the above-mentioned requirements, such as for example the proposals according to the Australian patent application AU-A 543,574 and according to the French patent application FR-A 2,489,002, provide for a helical course of the optical fibers in the longitudinal sense of the cable by means of which, for reasons already discussed in greater detail earlier, said conditions can in any case not be met. These proposals for fibers following a helical course do as a rule provide special measures to avoid the danger of tearing the fibers; the above-mentioned Australian application for example provides for the manufacturing of the cable at a temperature close to the upper limit of the operating temperature range, so that the entire cable contracts more than the fibers at median operating temperatures, resulting in the fibers becoming longer than the cable at median and low operating temperatures that may occur, and the French application No. 2,489,002 does for example provide for an elastic support of the fibers within the cable radially, by means of an intermediate layer of foamed material between fibers and fixed radial support means, but these measures do not suffice to completely remove the danger of fiber rupture and are especially unsuitable to protect the optical fibers according to the above-mentioned requirements from all axial tension loads, i.e. also from axial tension loads short of provoking fiber rupture.

Seen as a whole, it can be said about the state of the art as it pertains to cables of the type mentioned initially that it has not been possible until now to meet the requirement, under all conditions and combinations of conditions, that the optical fibers be protected from all axial tension loads and also from stronger curvatures such as the so-called micro-curvature could not yet be met completely until now with cables of the type mentioned initially.

THE OBJECTS OF THE INVENTION

It was therefore the objective of the instant invention to create a cable of the type mentioned initially as well as a process for its manufacture and a device to carry out this process, by means of which the above-mentioned requirement can be met completely and under all conditions.

According to the present invention, this objective is attained with a cable for the transmission of data with a number of optical fibers for signal transmission by means of electromagnetic radiations at wave length under 1 mm which are conveyed essentially in the longitudinal sense of the fibers, with guidance means for the guidance of the fibers on paths located in the inside of at least one cylinder-jacket-shaped shell, said path running in the longitudinal sense of the cable essentially in the form of waves with excursions in the circumferential direction of the cylinder-jacket-shaped shell in relation to attributed imaginary median lines lying within the cylinder-jacket-shaped shell and being essentially in parallel to the cylinder axis thereof, said guidance means being formed so that they fix the paths in the longitudinal sense of the cable only with distances in azimuthal direction and that therefore the paths being essentially movable in azimuthal direction up to the transition into straight lines.

The main advantage of the cable of the invention over the known cables of the type mentioned initially is without doubt the complete meeting of the mentioned requirement. A further, also very important advantage of the instant cable resides in the fact that the wave-shaped course of the fibers permits curvatures of the cable of nearly any extent, at least as far as the fibers are concerned, and among other things makes it possible for the reinforcement of optical fiber cables which until now had to be distributed over the cross-section of the cable to prevent excessive cable curvature, or had to be moved out to the periphery of the cable, to be brought back once more to the center of the cable or cable core, as is generally customary with other cables, so that the flexibility of cables containing optical fibers can thus be brought back to the values normally used for conventional cables, an advantage in handling cables containing optical fibers and one of most decisive significance in laying such cables. It is even possible to achieve even greater flexibility with the instant cable than with conventional cables and to use this to wind up the instant cable on cable rolls of considerably smaller diameter than that of conventional cable rolls, thus simplifying cable laying even more as compared to conventional cables. A further, very important advantage of the wave-shaped course within cylinder-jacket-shaped shells in the cable of the invention is the fact that the displacement of the conductors within the areas of cable curvature from the inside of the curve to the outside of the curve which is otherwise required with the generally used stranding of cables is not required with the cable of the invention and this, among other things, makes it possible to completely meet the requirement of protecting the fibers from any kind of axial tension load. And finally, the cable of the invention has the further important advantage that, because of the previously mentioned possibility to achieve an extremely high degree of flexibility, the cable of the invention can be laid not only along the conventional cable routes such as cable channels and open air lines, but also within buildings where, as is well known, the cable is bent much more than on the conventional cable routes; this in turn makes it possible to use the cable of the invention in the future also for telephone connection in buildings for the image-transmitting telephones with optical fibers as transmission channels which are in the planning stage.

In a preferred embodiment of the cable of the invention, all paths located in one and the same cylinder-jacket-shaped shell follow uniformly-sized maximum excursions in the circumferential direction of the cylinder-jacket-shaped shell in relation to the respectively assigned, imaginary median lines and the points of intersection of the paths inside this cylinder-jacket-shaped shell with the imaginary median line attributed to each are located in the cross-sectional planes, identical for all of the paths, of the cylinder-jacket-shaped shell and the path inclination with respect to the median line attributed to each is uniform for all path inclinations as to degree and orientation in all of these cross-sectional planes and for all paths.

In the cable of the instant invention, the paths can be constituted advantageously by equally long and equally bent path sections in the form of arcs of circles following each other, in at least one, preferably in all of the cylinder-jacket-shaped shells for the obtention of a minimal path curvature which remains constant in degree throughout the entire path length, each of these path curves being in the shape of a half wave of the eave-shaped path, whereby the centering angle of the individual arc-of-circle path sections, each of which constitutes a half wave of the wave-shaped path, is larger, preferably by a safety factor of at least 1.05; then $$362.3° \cdot \sqrt{1 - \sqrt{\frac{500 - p}{500 + 5p}}}$$

with a maximally possible elongation of p percent of the median line connecting the ends of the half wave. The advantage of such a path course is that minimal curvature of optical fibers can thus be achieved. The paths can then appropriately be bounded laterally by fixed links belonging to the guidance means and located between each pair of adjoining paths and thus also consisting of fixed link segments in a row, each constituting a half-wave and being in the form of an arc of circle.

Instead of such a throughout lateral bounding of the paths by fixed links however, it is also possible to provide advantageously for lateral bounding of the paths by fixed links only by segments or even only by points, whereby an at least nearly point by point lateral bounding of the paths by fixed links at the reversal points of the paths, in the areas of every second maximum excursion of the paths is most advantageous with sinus-shaped paths, for example.

It is especially advantageous for the paths to run sinus-shaped in at least one cylinder-jacket-shaped shell preferably in shells with maximum possible prolongations of the median line of more than 10%, whereby the ratio of the amplitude to the wave length of the sinus-shaped path course is larger, preferably by a safety factor of at least 1.1, than $$.15 \cdot \frac{100 + p}{100} \cdot$$

-continued $$\sqrt{1 - \frac{3}{2}\left(\frac{100}{100 + p}\right)^2} + \sqrt{1 - \frac{3}{4}\left(\frac{100}{100 + p}\right)^2}$$

with a maximally possible elongation of p percent of the median lines.

A sinus-shaped course of the paths is preferable with greater possible maximum elongations of the median lines which would result in excessive path inclination at the reversal points when the course of the path is composed of segments of arcs of circle and in any case such a sinus-shaped course results automatically from lateral bounding of the paths in segments by fixed links in the area of every second maximum excursion of the paths. With a sinus-shaped course, the paths can be bounded laterally by fixed links which are part of the guidance means, are located between each adjoining pair of paths and are thus also sinus-shaped.

It should be pointed out that with such a throughout lateral bounding of the paths by sinus-shaped fixed links or also of paths which are constituted by fixed link segments in the shape of arcs of circle, the fixed links should be sized or designed in such a manner, with respect to fixed link width as well as with respect to the material to be used for the fixed links, that the wave shape of the fixed links changes into an essentially straight-line shape in axial direction of the cable without any considerable resistance when said fixed links are subject to tension loads, whereby in any case no increase of the wave length with simultaneous maintenance of wave amplitude of this wave shape should be possible as a result of such tension load.

An especially advantageous embodiment of the cable of the instant invention results if each cylinder-jacket-shaped shell is bounded on its inside and on its outside by two essentially cylindrical pipes, whereby fixed links are installed in the space between the outer wall of the inner pipe and the inner wall of the outer pipe said fixed links being part of the guidance means and being located each between adjoining paths extending transversely to the longitudinal direction of the cable, essentially in radial direction of the shell and being connected to each other by connections between adjoining fixed links. The advantage of this design lies first of all in the fact that a cavity in the form of.

A cylinder jacket is created between the inner and the outer pipe and that this cavity is maintained also when internal pressures occur in the cable, e.g. at curves of the cable, thanks to the mutual support of inner and outer pipe across the fixed links, so that the wavy course of the paths within this cavity can change into a straight-line, or at least less markedly wavy configuration without any hindrance. Suitably, the configuration of the cable of the instant invention can also further be designed so that each of the fixed links lying between adjoining paths also assumes an essentially wave-shaped course, as do the paths, in the longitudinal direction of the cable, whereby the height of the fixed links, in one of the two circumferential directions with respect to the median line attributed to each, is equal to the distance between the outer wall of the inner pipe and the inner wall of the outer pipe and is smaller than this distance between inner and outer pipe in all other areas, and especially also in the areas of maximum excursion of the path in the other one of the two circumferential directions with respect to the attributed median line, whereby the connections between adjoining fixed links in the areas in which the fixed link height is less than the distance between inner and outer pipe consist preferably of small cross rods located near the outer wall of the inner pipe or near the inner wall of the outer pipe, each connecting adjoining fixed links in a spoke-like manner, whereby the fixed link height in the longitudinal direction of the cable preferably follows an essentially wave-shaped course around a median value which is less than the distance between the inner and the outer pipe, whereby the maximum values of this wave-shaped course of the fixed link height are situated in the areas of maximum path excursion into the one, mentioned circumferential directions of the two, while the minimum values of said course are situated in the areas of maximum path excursion in the other, mentioned circumferential direction with respect to the median line assigned to each. The advantage of this further embodiment lies in the fact that the fixed links which bound the paths throughout can pass without hindrance from its wavy shape into a straight-line or less wavy shape in the areas where the height of the fixed link is less than the distance between inner and outer pipe within the above-mentioned cylinder-jacket shaped cavity, and in the fact that the paths lying between the fixed links can therefore be brought into the applicable, required form without being subjected to any forces, so that when there are changes of the wave form of the fixed links, no forces are influencing the optical fibers running in the paths, however this advantage is only obtained if a solid mechanical coupling between the areas of fixed links with heights equal to the distance between the inner pipe and the outer pipe on the one hand, and the inner and outer pipe on the other hand is ensured because only with such a solid mechanical coupling is it possible for the forces which are needed to change the wavy form of the fixed links to be transferred from the cable or from the inner and outer pipes to the fixed links. By contrast to this, the above, especially advantageous design of the cable of the instant invention can also be further designed in such manner that each of the fixed links lying between adjoining paths also assumes an essentially wave-shaped course, as do the paths, in the longitudinal direction of the cable, whereby the height of the fixed links, over their entire length, is less than the distance between the outer wall of the inner pipe and the inner wall of the outer pipe and preferably at least nearly constant and whereby the fixed links, in addition to their wave-shaped course dictated by the wave-shaped course of the paths, with excursions in the circumferential direction of the cylinder-jacket-shaped shell additionally assume such a wave-shaped course with excursions in radial direction of the shell that the fixed links rest with their inner side on the outer wall of the inner pipe in one of the two circumferential directions with respect to the median line attributed to each, and rest with their outer side on the inner wall of the outer pipe in the areas of maximum path excursion in the other one of the two circumferential directions with respect to the median line attributed to each, whereby they center the inner and the outer pipe in relation to each other as a result of their intrinsic elasticity, whereby means are preferably provided for the attainment of a minimal friction coefficient in the areas in which the fixed links rest on the outer wall of the inner pipe and on the inner wall of the outer pipe and whereby the connection between adjoining fixed links, in the areas in which said fixed links do not rest on the inner or outer pipe, are constituted by small cross-rods, connecting adjoining fixed links in a spoke-like manner, located near the outer wall of the inner pipe or near the inner wall of the outer pipe. In this case, because of the previously mentioned minimal friction coefficients, there exists basically no, or only an almost negligibly minimal mechanical coupling in the individual areas of contact between the fixed links on the one hand and the cable or the inner or the outer pipe on the other hand through which the forces required to change the wavy shape of the fixed links are then transferred from the cable or from the inner and outer pipe to the fixed links when the cable is curved at a particular point for instance, and because of this missing, or very minimal mechanical coupling between fixed links and inner or outer pipe in the individual areas of contact, the fixed links, and with them the paths lying between them, are in principle advantageously freely movable within the cylinder-jacket-shaped shell, but on the other hand this free mobility at the point of cable curvature exists only for so long as the spring constituted by the fixed links between inner and outer pipe is not completely compressed, with the fixed links being thereby pressed in between inner and outer pipe, so that the degree to which the cable be bent is somewhat smaller with the latter embodiment of the above-mentioned, especially advantageous design of the cable than is the case with the former embodiment. Free mobility of the paths within the cylinder-jacket-shaped shell without such a danger of jamming of the paths or wedging of the fixed links by which they are bounded at points of strong curvature of the cable is finally attained in a preferred further embodiment of the above-mentioned, especially advantageous design of the cable of the instant invention, in that fixed links are provided only the areas of maximum excursion of the paths in one of the two circumferential directions with respect to the attributed median line each between adjoining paths, and in that the height of these fixed links is equal to the distance between the outer wall of the inner pipe and the inner wall of the outer pipe and in that no fixed links are provided between adjoining paths in any of the other areas, and in particular not in the areas of maximum path excursion in the other one of the two circumferential directions with respect to the attributed median line, in that the fixed links are connected to each other by solid bridges between each adjoining pair of fixed links in the circumferential direction of the cylinder-jacket-shaped shell and in that they are preferably connected to each other in the longitudinal direction of the cable by a rubber-like band located near the inner wall of the outer pipe or near the outer wall of the inner pipe, said band extending in the longitudinal direction of the cable and consisting of a highly elastic material. This preferred further embodiment combines the advantages of the two first-mentioned embodiments, i.e. the freedom from forces affecting the paths achieved with the first embodiment and of the optical fibers running within them and the free mobility of the paths within the cylinder-jacket-shaped shell which can be achieved with the second embodiment, but is not tied to the limiting requirements applying to this first embodiment, such as the requirement of a solid mechanical coupling between fixed links and inner as well as outer pipe in the first embodiment and the requirement that curves in the cable may not be excessive in the second embodiment, so that it is to be viewed on the whole as an advantageous further embodiment of the above-mentioned, especially advantageous designs of the cable of the instant invention.

The wave length of the wave-shaped course of the path may advantageously lie within the range of 2 to 20 cm, preferably of 2 to 5 cm with the cable of the instant invention.

To particularly great advantage with the cable of the instant invention, the guidance means for the guidance of the fibers may furthermore comprise small tubes within which the fibers run, and in that the small tubes extend along the paths. In this case a plurality of fibers can run appropriately within each small tube, since said small tubes are subjected practically to no external pressure that may press the fibers running within the small tube against each other, thus causing micro-curvature of the fibers. The advantage of such small tubes resides in the fact that on the one hand they are capable of conducting a greater number of optical fibers, just as the hard small tubes mentioned initially, and on the other hand, as mentioned, are not subjected to any external pressure which could press the fibers running within said tube against each other or against the inner wall of the tube, and can therefore be manufactured at low manufacturing cost from a soft material, contrary to the relatively high cost involved with the manufacture of the known, hard small tubes, and because of this soft material they do not even require any special nylon sliding surface on the inner wall of the small tube, as required by the known, hard small tubes. It should furthermore be noted, in this context, that the utilization of such small tubes is of great advantage, especially with the above-mentioned further embodiment of the mentioned, especially advantageous design of this cable. Of course it is possible for just one fiber, instead a plurality of fibers to run within each small tube and thereby in each path, but when only one fiber is used per path, this cable can practically also be made entirely without such small tubes.

The invention further relates to a process to manufacture the cable of the instant invention, wherein all the fibers attributed to one cylinder-jacket-shaped shell and the guidance means for the guidance of said fibers on paths taking an essentially wave-shaped course in the longitudinal direction of the cable are gathered together in a band assigned to one of the cylinder-jacket-shaped shells concerned on which the paths assume an essentially wave-shaped course with excursions in the transversal direction of the band in relation to the median lines attributed to the bands in the longitudinal direction and wherein the guidance means being formed so that they fix the paths in the longitudinal sense of the cable only with distances in azimuthal direction and that therefore the paths being essentially freely movable in azimuthal direction up to the transition into straight lines and wherein the band is wrapped around the space within the inner part of the cable which fills the cylinder-jacket-shaped shell concerned in such a manner that the longitudinal direction of the band essentially coincides with the longitudinal direction of the cable.

The process has the decided advantage that the possibility is given for the first time to manufacture cables containing optical fibers in continuous production, whereby relatively high percentile elongations, e.g., as a result of thermal expansion, are admissable because the high tolerance of the percentile degree of elongation can be ensured by the wave-shaped course of the fibers on the band and because the band can then be incorporated into the cable at the same speed as the other parts of said cable.

In a particularly advantageous variation of this process, the inner part of the cable is provided with an inner pipe which bounds said inner part before the band is installed, whereby an additional outer pipe, enclosing the band wrapped around the inner pipe, is installed on that part of the cable which is constituted by the inner part of the cable with the inner pipe and the band which is wrapped around it, whereby the installation of the inner pipe and the outer pipe is effected preferably by extrusion and wrapping of the band around the inner pipe. preferably by means of a admission hopper which gradually imparts the shape of a cylinder jacket to the band as it is fed to the inner pipe. This variation of the process for the manufacture of the cable of the instant invention has the advantage that by means of it the above-mentioned especially advantageous design of the instant cable, in the sense of the main advantage of the process, can be made in continuous production.

In the process for the manufacture of the instant cable, the band can with special advantage be constituted by a band-shaped element provided with fixed links as guidance means and by a multitude of small tubes, also serving as guidance means, within which the fibers are running, and in that each individual small tube is inserted between adjoining fixed links for that purpose. This composition of the band, from a band-shaped element provided with fixed links and small tubes has the advantage, already mentioned above in the context of utilization of small tubes as guidance means, that within each small tube a plurality of fibers can run, so that a three-figure number of fibers can be contained without difficulty in a cylinder-jacket-shaped shell, whereby this can be achieved with simple and therefore inexpensive, continuous process steps. For the manufacture of the above-mentioned first or second embodiment of the above-mentioned, especially advantageous design of the instant cable, an element with interconnected fixed links which laterally bound the wave-shaped paths and which also follow a wave-shaped course in the longitudinal band direction is used as the band-shaped element, whereby the small tubes are inserted along a wave-shaped course into the paths constituted between each pair of adjoining fixed links. Preferably however, for the manufacture of the above-mentioned especially advantageous design of the instant cable, a rubber-like flat band is used as the band-shaped element, said flat band being provided with fixed links when it is in a relaxed state, said fixed links being at intervals equal to one wavelength each of the wave-shaped course of the paths, each of these fixed links extending over a fraction of the wavelength, whereby this flat band is stretched in proportion to the planned path length of the wave-shaped path course to the length of the cable before the insertion of the small tubes between the fixed links in longitudinal band direction and whereby the small pipes are then essentially inserted in a straight line between the fixed links and are preferably held there by clamping, the flat band then being relaxed again so that the small tubes assume the planned, wave-shaped path course by themselves as the flat band is relaxed. This latter process variant has the advantage that the insertion of the small tubes between the fixed link in a straight line is naturally much simpler and therefore proportionately less expensive than the insertion in a way course, as mentioned for the previously-mentioned process variant. In the last-mentioned process variant, in order to provide the rubber-like flat band with fixed links extending over a fraction of the wave length, a fixed link rail extending transversely to the band, with bridges located in the area of the underside of the rail which is connected to the flat band can be used between each pair of adjoining fixed links to edge the rubber-like flat band with fixed links extending over a fraction of the wave length, said fixed link rail being designed so that when it is bent together into an essentially cylindrical form with the rail underside on the outside there results a configuration similar to a piece of pipe, with a cross-section approaching the cross-section of the corresponding cylinder-jacket-shaped shell and with oblong recesses having cross-sections preferably in the form of an equilateral triangle in the pipe wall of said piece of pipe to accept the above-mentioned small tubes, whereby the fixed link rails are bent up with the underside of the rail to the inside for the insertion of the individual small tubes between each pair of adjoining fixed links in such a manner that adjoining fixed links are spread apart at least sufficiently so that the small tubes can be inserted between them, preferably by feeding the flat band with the fixed link rails attached to it in a sufficiently spread-out position for the insertion of the small tubes between the fixed links, over a surface and/or guide for the upper portion of the fixed links which reaches over the width of the band or over several such surfaces and/or guides provided in the area of the bridges between the rails, with a convex configuration in the transversal direction of the band, whereby the small pipes are inserted between the fixed links after the fixed link rails are bent up, whereby the fixed link rails are bent back into the opposite direction after being bent up and after insertion of the small tubes, preferably until the small tubes are clamped fast between the fixed links, and whereby the flat band with the fixed link rails upon it and with the small tubes inserted between the fixed links is then released so that the small tubes assume the planned, wave-shaped course of the path as a result and so that the band, constituted by the flat band, the fixed link rails and the small tubes is then wrapped around the inner portion of the cable, with the flat band on the outside. In this case, the fixed link rails can be produced advantageously in the above-mentioned bent-together form of a piece of pipe by extrusion and separation by disks, the disk thickness of the extrudate being equal to the length of said piece of pipe, whereby said fixed link rails are combined with the rubber-like flat band through plastic welding. The invention furthermore relates to a device to carry out the process for the manufacture of the cable of the instant invention, with means for the continuous build-up of the cable, comprising means for the formation of the pipe-shaped shells encompassing the entire cable and/or parts thereof which are essentially concentric with respect to the axis of the cable, and with means for the production of at least one band with optical fibers and guidance means to guide them with excursions in the transversal direction of the band with respect to median lines attributed to each band and running in the longitudinal sense of the band in essentially wave-shaped paths, said guidance means being formed so that they fix the paths in the longitudinal sense of the cable only with distances in azimuthal direction and that therefore the paths being essentially movable in azimuthal direction up to the transition into straight lines, and with means for wrapping the band around a portion of the cable previously built up within the framework of continuous cable build-up so as to produce a cylinder-jacket-shaped shell surrounding this already built-up portion of the cable, the longitudinal sense of the band essentially coinciding with the longitudinal sense of the cable. The device can here advantageously comprise a first extruder to apply an inner pipe surrounding the cable core to said cable core by an admission hopper installed after the first extruder in the sense of cable movement during its manufacture by means of which the band is gradually brought into an essentially cylinder-jacket-shaped form which surrounds the inner pipe as it transferred to the cable being manufactured or to the inner pipe applied by the first extruder to the cable core and characterized by a second extruder installed after the admission hopper in the sense of cable movement during its manufacture to apply an outer pipe to the cable said outer pipe surrounding the cable core and the inner pipe surrounding it as well as the band wrapped around the latter. The device has the advantage, by comparison with most of the known devices used in the manufacture of cables, of requiring comparatively low technical costs because, in contrast, to most known devices for the manufacture of cables, it contains no means for the stringing of the cable or parts thereof, and because in the known devices for cable manufacture a considerable, and often even a major portion of the total technical costs go for such stranding means.

The means for the manufacture of the band can, in devices to carry out the process for the manufacture of the cable according to invention, comprise means for the manufacture of a band-shaped element with fixed links serving as guidance means and means for the supply of small tubes in the interior of which run the optical fibers as well as means for the insertion of the small tubes between each pair of adjoining fixed links. Here, especially for the manufacture of the above-mentioned first and second embodiments of the above-mentioned, especially advantageous design of the cable according to invention, the means for the manufacture of a band-shaped elements provided with fixed links serving as guidance means can comprise embossing means, preferably an embossing roll to emboss the wave-shaped paths while at the same time forming fixed links between each pair of adjoining paths onto a band blank made of a ductile material, preferably of the group of thermoplastic, elastomer, cross-linked or not cross-linked as well as felt-like materials and comprise means, preferably extrusion means, for the supply of the band blank, whereby the means for the insertion of the small tubes between each pair of adjoining fixed links are means for a wave-shaped insertion which preferably comprise means for the production of a relative movement in the transversal direction of the band between the band-shaped element and the small tubes to be inserted into it while said small tubes are being inserted. Preferably however, especially for the manufacture of the above-mentioned, preferred embodiment of the above-mentioned especially advantageous design of the cable according to invention, the means for the manufacture of a band-shaped element with fixed links serving as guides comprise means, preferably extrusion means for the supply of a rubber-like flat band and means for the supply of fixed link rails each of which extends over a fraction of the wave length of the wave-shaped course of the path, with bridges between adjoining fixed links provided in the area of the underside of the rails, preferably in the form of extrusion means for the extrusion of the fixed link rails in configured so as to be bent together into shape like a piece of pipe as well as separating means to separate the fixed link rails from the extrudate in disks as well as means, preferably a plastic welding device, to connect the fixed link rails on their rail underside to the flat band, whereby the means for the insertion of the small tubes between each pair of adjoining fixed links are means for an essentially straight-line insertion and comprise means for stretching the rubber-like flat band with its fixed link rails at the ratio of the planned path length of the wave-shaped course of the path to the cable length before the insertion and for the release after insertion, and furthermore means to bend up the fixed link rails with the rail underside on the inside, in order to obtain spreading of all adjoining fixed links away from each other at least until the small tubes can be inserted between them, preferably in the form of a track roller for the flat band with the fixed link rails, having a running surface convex toward the outside and, suitably, an additional running surface with wave troughs transversal to the running direction in the area of the fixed links with wave peaks in the area of the bridges between the fixed links. The last mentioned design of the device to carry out the process for the manufacture of the cable according to invention, in addition to the already mentioned relatively low technical costs, has the further special advantage that the path length of the wavy path course and thereby its relationship to the length of the cable or the admissible percentage of extendibility of the cable can be changed in a simple manner by simple adjustment of the speed ratios of two conveyor rollers which cause the stretching of the rubber-like flat band, said flat band being guided over said rollers, and in that the device can thereby be adapted easily to the required percentage of extendibility which applies to the cable to be manufactured.

BRIEF DESCRIPTION OF THE VIEWS

The invention is explained in further detail in the following drawings illustrating an example of an embodiment, where FIG. 1 is a schematic representation of an example of an embodiment of a device for the production of a cable according to invention;

Detailed Description

Figure 1:
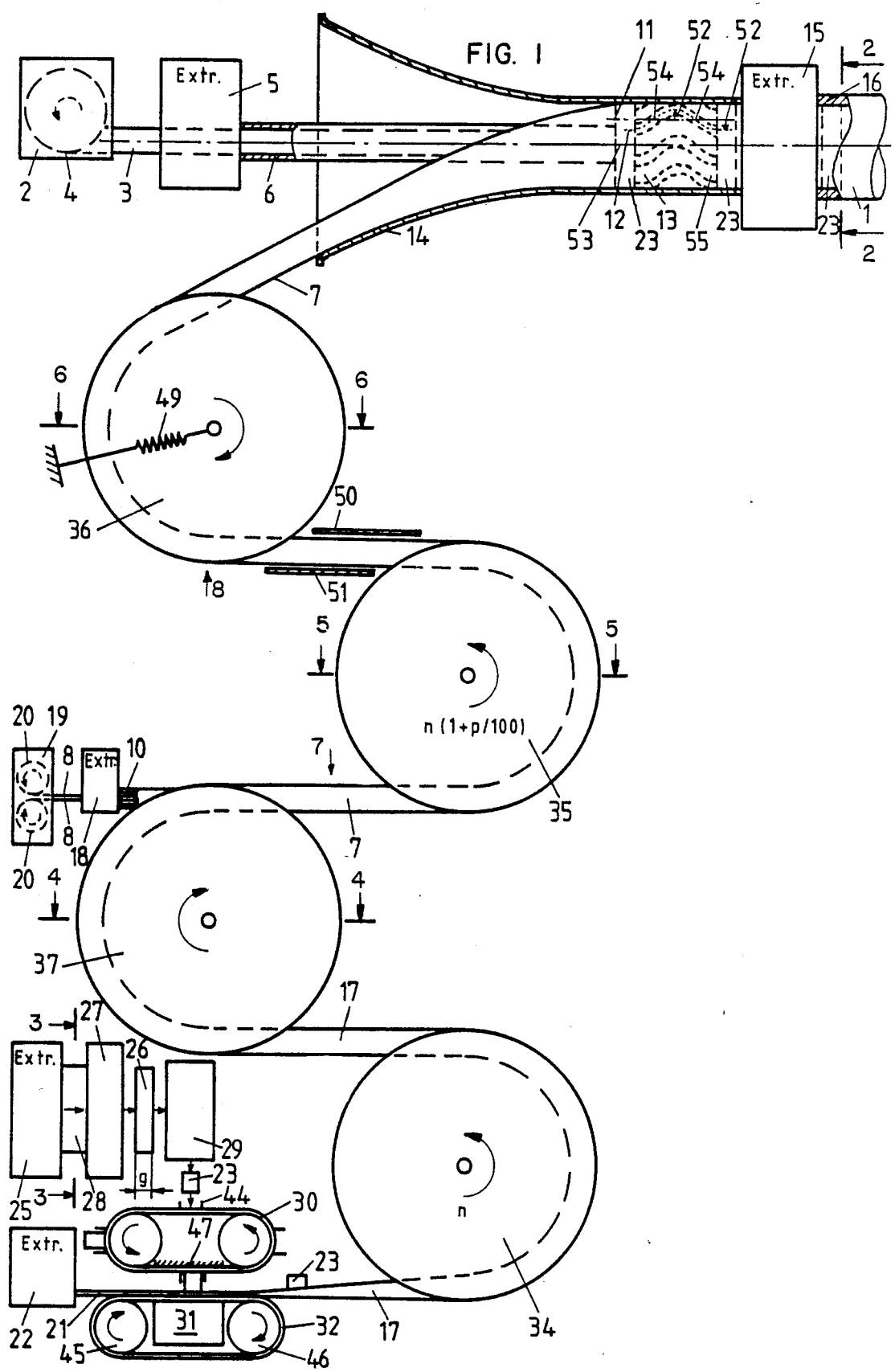

The device for the manufacture of a cable in accordance with the invention, shown in FIG. 1, comprises as a means for continuous build-up of the cable 1 means 2 for the continuous supply of a cable core, here in form of the cable core roll 4 indicated by broken lines inside block 2, a first extruder 5 for the supply of an inner pipe 6 to the cable core 3 and surrounding said cable core 3, means for the continuous production of a band 7 with optical fibers 8 as well as fixed links 9 and small tubes 10 as guidance means to guide the optical fibers 8 with excursions in a transversal direction to the band 7 in relation to assigned median lines 11 running in the longitudinal sense of band 7 in essentially wave-shaped paths 12, means to wrap the band 7 around the inner pipe 6 into a cylinder-jacket-shaped shell 13 surrounding this inner pipe 6, said means being in the form of an admission hopper 14 located after the first extruder 5, in the sense of movement of the cable 1 during its manufacture, by means of which the band 7 is brought gradually into an essentially cylinder-jacket-shaped form as it runs towards the cable being manufactured or towards the inner pipe 6 transferred by the first extruder 5 to the cable core 3, and a second extruder 15, installed after the admission hopper 14 in the sense of movement of the cable during its manufacture and supplying the cable 1 with an outer pipe 16 to surround the cable core 3, the pipe 6 surrounding it as well as the band 7 which is wrapped around said pipe.

In the device according to FIG. 1, the means for the continuous production of the band 7 comprise means for the continuous production of a band-shaped element 17 equipped with fixed links 9 serving as guidance means and extrusion means 18 in form of six individual extruders or of one multiple extruder to supply six small tubes 10 to be inserted into the band-shaped element 17 between the fixed links 9 and furthermore means 19 for the continuous supply of the optical fibers 8 to be pulled into the small tubes 10 and which are indicated here by broken lines in form of the fiber rolls 20 inside block 19, as well as means for the insertion of the small tubes 10 between each pair of adjoining fixed links 9. The means for the continuous production of the element 17, equipped with the fixed links 9 serving as guidance means comprise here means for the delivery of a rubber-like flat band 21, here in form of an extruder 22, and means for the delivery of fixed link rails 23 each of which extends over a fraction of the wave-length l of the wave-shaped course of the paths, with bridges 24 between adjoining fixed links 9 in the area of the underside of the rails, here in the form of an extruder 25 to extrude the fixed link rails in a form bent together into a pipe-section-like formation 26, as well as separating means 27 to cut off the fixed link rails 23 from the extrudate 28, shown in cross-section in FIG. 3, of extruder 25 as well as furthermore means 29 to cut open pipe-section-like formation at the locations which can be seen in FIG. 2, in the middle between one of the rails as well as at the tips of the triangular recesses in the pipe wall of the pipe-section-like formation 26 and for the straightening of the fixed link rails 23 once they have been cut open as well as for the conveying of the fixed link rails 23 to a conveyor band 30 which conveys the fixed link rails 23 to the rubber-like flat band 21 and installs each of them upon it with the underside of the rail placed on it and then continues to convey them together with the band while pressing them down on it, and furthermore means to bond the fixed link rails 23 with the underside of the rails to the rubber-like flat band 21, here in the form of a plastic welding device 31 for high-frequency welding of the undersides of the rails of fixed link rails 23 to the flat band 21 while the flat band 21 is being conveyed by means of conveyor belt 32 across the welding device 31, and means for the insertion of the small tubes 10, each between adjoining fixed links 9 are, in the device according to FIG. 1, means for the insertion in an essentially straight-line of the small tubes 10 and comprise means to stretch the rubber-like flat band 21 edged with the fixed link rails 23 by p percent at the ratio (1+p/100):1 of the planned path length of the wave-shaped course of the path to the length of the cable before insertion as well as for releasing the flat band 21 after the insertion of the small tubes, whereby these means are here in the form of the two conveyor rollers 34 and 35 running at different speeds n and n(1+p/100) so as to thereby cause a stretching of the flat band 21 by p percent in the area between the first 34 and the second conveyor roller 35, with fingers 33 (see FIG. 5) to grasp the fixed links 9 and thereby to convey the rubber-like flat band 21 edged with the fixed link rails 23 without slippage, as well as in form of an elastically suspended deflection roller 36 which thereby decreases the tension of the flat band 21 stretched by the conveyor rollers 34 and 35 to a lower value, corresponding to the spring 49 force of the elastic suspension, thus releasing the flat band 21 to a considerable extent, and furthermore means to bend up the fixed link rails 23 with their rail underside turned inward to cause the adjoining fixed links 9 of each pair to spread apart at least sufficiently to allow the insertion of the small tubes 10 between them, here in form of a roller 37 in the area between the two conveyor rollers 34 and 35 and shown in the longitudinal section in FIG. 4, for the flat band 21 edged with fixed link rails 23, with a running surface 38 that is convex to the outside and furthermore wavy transversely to the running direction, with wave troughs 39 in the area of the fixed links 9 and wave peaks 40 in the area of the bridges 24 between the fixed links 9, and finally means to bend the fixed link rails 23 back into the opposite sense after having been bent up and after the insertion of the small tubes 10 and before the release of the flat band 21, until the small tubes 10 are clamped fast between the rails 9 and in order to maintain the curvature of the fixed link rails 23 in the opposite direction and thereby the clamping of the small pipes 10 between the fixed links 9 until the band 7 is transferred to the cable 1 being produced and subsequently also within the cable, here in the form of a convex configuration of the running surface of the conveyor roller 35 towards the outside, as can be seen in the cross-section in FIG. 5, to achieve the bending of the fixed link rails 23 into said opposite direction before release of the flat band 21 as well as in form of the convex configuration of the running surface 42 of the deflection roller 36 towards the inside, as can be seen in the cross-section in FIG. 6, to maintain the curvature of the fixed link rails 23 into said opposite direction after release of the flat band 21 as well as finally a convex configuration towards the inside of the inner wall, constituting the running surface of band 7 as it is transferred to the cable 1 being produced, of the admission hopper 14 which also maintains this curvature of the fixed link rails 23 in said opposite direction and further reinforces it as band 7 is gradually wrapped around the inner pipe 6 and in form of the convex configuration of the inner wall of the outer pipe 16 towards the inside which finally and permanently sets this increased curvature of the fixed link rails 23 in said opposite direction.

THE OPERATION

Figure 3:
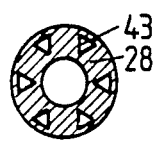
FIG. 3 is a cross-section in the plane 3—3 of FIG. 1 through an extrudate serving to produce fixed link rails.
Figure 4:
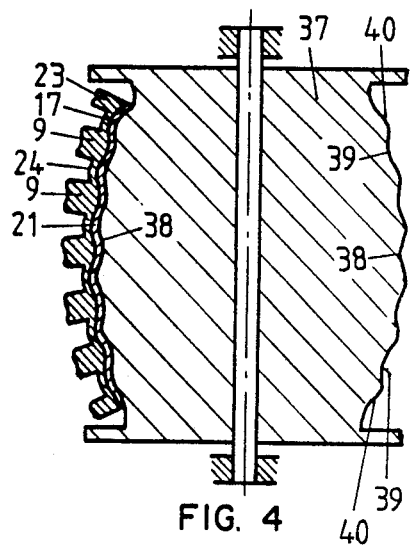
FIG. 4 is a longitudinal cut in plane 4—4 of FIG. 1 through a roller of the device of FIG. 1 for the band edged with fixed link rails.
Figure 5:
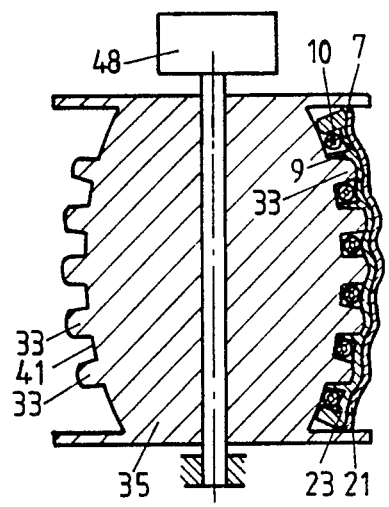
FIG. 5 is a longitudinal cut in plane 5—5 of FIG. 1 through a deflection roller of the device of FIG. 1 which causes stretching of the band edged with fixed link rails.
Figure 6:
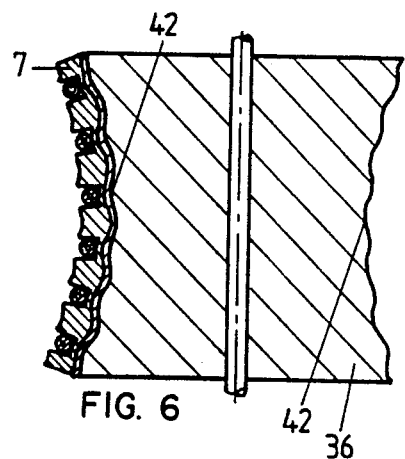
FIG. 6 is a longitudinal section in plane 6—6 of FIG. 1 through a roller of the device of FIG. 1 for the band edged with fixed link rails and with small tubes for the optical fibers.
Figure 7:
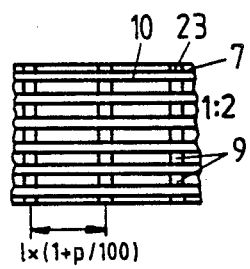
FIG. 7 is a top view in viewing direction 7 of FIG. 1 at a reduced scale (1:2) of the band edged with fixed links rails and with small tubes for the optical fibers.
Figure 8:
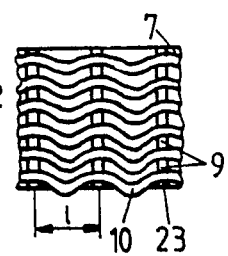
FIG. 8 is a top view in viewing direction 8 of FIG. 1 at a reduced scale (1:2) of the band edged with fixed links rails and with small tubes for the optical fibers.

The process for the manufacture of the cable 1 shown in FIG. 1 by means of the device shown in FIG. 1 is a continuous process which proceeds as follows: The extruder 22 supplies a rubber-like flat band 21 having a width and a relatively smaller thickness in the order of 0.5 to 2 mm and having a length, per time unit, approximately equal to the length per time unit of the cable 1 being produced, approximately at the production speed of cable 1. At the same time the extruder 25 delivers the extrudate 28 shown in cross-section in FIG. 3, of which the fixed link rails 23 are made, said extrudate 28 having an inner diameter equal to the diameter of the inner pipe 6 of cable 1 and having an outer diameter equal to the inner diameter of the outer pipe 16 less the double thickness of the flat band 21, as well as being provided with six recesses 43 with cross-sections close to an equilateral triangle, this at a speed which is lower than that of the production speed of cable 1 by approximately the ratio of width g of the fixed link rails 23 to the wave length l of the wave-shaped course of the paths 12. Disks with a thickness equal to the thickness g of the fixed link rails 23 are cut by means of the separating means 27 from the extrudate 28 delivered by the extruder 25, each of these disks being bent together into a pipe-section-like formation 26 having the cross-section shown in FIG. 1b, and these disks or pipe-section-like formations 26 are then transferred to the means 29 where they are cut open at the locations indicated in FIG. 2, in the middle between one of the fixed links, as well as at the tips of the triangular recesses 43 in the pipe wall of the pipe-section-like formation 26 and are then straightened into fixed link rails 23, said fixed link rails 23 thus formed being then transferred to the conveyor belt 30. In principle, this cutting-open can also be dispensed with if the extrudate 28 is already extruded in "cut open" form by the extruder 25, but in that case special measures would have to be taken to ensure that smooth cutting surfaces are produced on the cut pipe-section-like formations 26, said measures consisting for instance in enclosing the extrudate 28 and the pipe-section-like formation 26 to be cut off on either side of the cutting point on the outside by an outer pipe and on the inside by an inner pipe on either side of the cutting point as well as in a closed-loop cutting wire rotating at high speed. In that case the means 29 would no longer be used for cutting, but only to straighten and transfer the thus formed fixed link rails 23 to the conveyor belt 30. In general it would of course also be possible to extrude the fixed link rails 23 directly in a "cut open and straightened" form by means of the extruder 25 and then to cut off fixed link rails 23, each in width g, from the extrudate 28, using the separating means 27, and to transfer them to the means 29 which would only serve to further convey the fixed link rails 23 to the conveyor belt 30 in that case, but the extrusion of the fixed link rails 23 bent together into pipe-section-like formations 26 has the advantage over such an extrusion of the fixed link rails 23 in a "cut-open and straightened form" that the fixed link rails 23 are extruded in the very form which they assume inside the cable 1 when it is completed, so that the fixed link rails 23 are not exposed to any structural stresses inside the completed cable 1. With each of the three above-mentioned possibilities as well as with the extrusion in uncut form and also with the extrusion in "cut-open" form, and with extrusion in "cut-open and straightened" form, the means 29 transfer the individual fixed link rails 23 in such a position to the conveyor belt 30 that the underside of a fixed link rail 23 located on the side of bridge 24, between the fixed links 9, is turned away from the conveyor belt 30 and so that the fixed links 9 of a fixed link rail 23 transferred by the means 29 to the conveyor belt 30 come to rest with their upper side on the conveyor belt 30. The conveyor belt 30 is provided with grasping devices 44, only indicated schematically in FIG. 1, at intervals of one wave-length l of the wave-shaped course of the paths 12; said grasping devices 44 seize the transfer means of means 29 which transfer the fixed link rail 23 or its fixed links 9 to the conveyor belt 30 at the upper side of the fixed links at the moment of passing such a grasping device 44, so that the fixed link rail 23 is then carried away together by conveyor belt 30. Conveyor belt 30 moves at the same speed at which extruder 22 delivers the flat band 21, i.e. at approximately the production speed of cable 1, and conveys the fixed link rails 23 taken over from the means 29 to the flat band 21 and installs them with their rail underside on the flat band 21 at the intervals of the grasping devices 44 and thereby also at the interval of one wave length l of the wave-shaped course of the paths 12 and then continues to convey them at the running speed of the flat band 21 until they have passed the plastic welding device 31 together with the location on the flat band 21 on which each has been installed, whereupon the grasping devices 44 release each fixed link rail 23 in turn so that the fixed link rails 23 can move on together with the flat band 21 and so that the now empty grasping devices 44 can be conveyed back by conveyor belt 30 to the means 29 to receive new fixed link rails 23. The plastic welding device 32 welds the fixed link rails 23 by means of high-frequency welding with their rail undersides to the flat band 21, each at the point on which it was installed by the conveyor belt 30, while the continuously moving flat band 21 with the installed fixed link rails 23 passes the plastic welding device 31. During this passage, while the welding takes place, the fixed link rails 23 continue to be conveyed further by the conveyor belt 30, as mentioned earlier, and the flat band 21 is conveyed by conveyor belt 32 at the same speed. The conveyor belt 30 is wavy transversely to its direction of movement in adaptation to the wavy rail underside of the fixed link rail 23, indicated for instance in FIGS. 1c, 1d and 1e, resulting from the extrusion of the fixed link rails in the earlier-mentioned bent-together form so that the rail underside of the fixed link rail 23 can fit exactly into the wavy conveyor belt 32 and so that the rail underside of the fixed link rail 23 can be pressed upon the flat band 21 over its entire surface while being welded to said flat band 21 so that a solid and permanent welded bond can be achieved between the fixed link rails 23 and the flat band 21. In addition, the wavy conveyor belt 32 has the further advantage that the fixed link rails 23, as they are being installed on the flat band 21, and the waved conveyor belt 32 below can still be adjusted in relation to the flat band 21 transversely to the direction of movement of the conveyor belt 30, and for this purpose the grasping devices 44 can be installed so as to be capable of transversal displacement on the conveyor belt 30. In this case the conveyor belt 32 can be wavy either on its outer side towards the flat band 21 only, or throughout, i.e. on its outside and its inside, whereby the running surfaces of the two conveyor wheels 45 and 46 of the conveyor belt 32 and the running surface for the conveyor belt 32 on the upper side of the welding device 31 towards the flat band 21 are smooth and, in the latter case are wavy in function of the waviness of the inside of the conveyor belt 32. So that the conveyor belt 32 which presses up from below on the rail underside of the fixed link rails 23 and the flat band 21 may not become bonded to each other or stick together in any other way during the welding process, the conveyor belt 32 is made of a material which does not heat up during high-frequency welding and has no adhesive properties, especially not in relation to the material of the flat band 21. The fixed link rails 23, i.e. the rail undersides are firmly pressed down from above on the flat band 21 by the conveyor belt 30 pressing down upon the upper side of fixed links 9 or by the support element 47 supporting the conveyor belt 30 in the welding area and which may either be rigid, as shown in FIG. 1, or may be flexible by means of spring pressure directed upon the conveyor belt 30, whereby the earlier-mentioned solid and permanent welding bond is obtained between the rail undersides of the fixed link rails 23 and the flat band 21 in welding the fixed link rails 23 to the flat band 21. Because of the pressure of the conveyor belt 30 upon the upper side of fixed links 9 it is recommended that the material used for the conveyor belt 30 be also one which does not heat up during high-frequency welding and which does not have any adhesive characteristics in relation to the material of the fixed link rails 23, so that the upper side of fixed links 9 of fixed link rails 23 are also prevented from adhering to the conveyor belt 30 during the welding process or stick to it in any other way. The band-shaped element 17, provided with fixed links 9 and produced by the welding of the fixed link rails 23 with their rail underside to the flat band 21, is then conveyed to the conveyor roller 34 and is guided over it in such a manner that the flat band 21 is on the outside, as can be seen in FIG. 5, for example. In this case the conveyor roller 34 is of the same configuration as the conveyor roller 35 shown in longitudinal section in FIG. 5, so that a section through the conveyor roller 34 along a sectional plane identical to the sectional plane 5—5 of the longitudinal section of conveyor roller 35 shown in FIG. 5 looks exactly as does the longitudinal section through conveyor roller 35 shown in FIG. 5, except that the band-shaped element 17 is not yet provided with the small tubes 10 between the fixed links as it passes the conveyor roller 34. The conveyor 34 serves in principle to keep the stretched portion of the band-shaped element 17, i.e. the area of longitudinal tension within the rubber-like flat band 21 resulting from this elastic stretching, away from the welding area and also from the extruder 22 so that the process of welding the fixed link rails 23 with their rail underside to the flat band 21 may take place practically without longitudinal traction being exerted upon the flat band 21 and so that the danger of tearing during the weldin of the heated, and therefore softened flat band 21 may be eliminated, and furthermore also to prevent a relatively strong longitudinal pull being exerted upon the flat band 21 leaving the extruder 22 and which is therefore still warm and accordingly soft so that the danger of tearing the flat band at the exit of the extruder 22 is eliminated. The conveyor roller 34 rotates therefore at a speed n which is such that the band-shaped element 17 running over the conveyor roller 34 moves at the same speed as the flat band 21 in the welding area and thereby at the same speed as the two conveyor belts 30 and 32, the running speed of which is identical with the production speed of the flat band 21 as it goes through extruder 22. In order to avoid slippage of the band-shaped element 17 running over roller 34 against said conveyor roller 34 in the direction of the area between the two conveyor rollers 34 and 35 (slippage which would occur without special measures being taken because of the stretching of the band-shaped element in this area and because of the greater longitudinal tension of the band-shaped element 17 resulting therefrom in said area as compared to the practically negligible longitudinal tension of the band-shaped element 17 before it reaches the conveyor roller 34), the conveyor roller 34, just as the identically configured conveyor roller 35, is equipped with fingers 33 which lie down in front of the fixed links 9 of the band-shaped element 17 running over the conveyor roller 34 and equipped with these fixed links and which thus prevent the band-shaped element 17 from slipping away, i.e. form slipping in relation to the conveyor roller 34. In a manner the fingers of the conveyor roller 34 therefore brake the band-shaped element 17 so that it is prevented from moving more rapidly, in slipping, than the conveyor roller 34, and therefore no drive is needed for the conveyor roller 34 but only a controllable brake which is preferably constituted by an electric machine wired in the manner of a generator, the braking force of which is controlled via a closed control circuit with, as its regulating criterium, the longitudinal tension of the band-shaped element 17 before it reaches the conveyor roller 34, set to a very low set point, so that the speed of the band-shaped element 17 in the welding area, that is to say the running speed of the two conveyor belts 30 and 32, equal to the speed at which the flat band 21 is produced by the extruder 22 is obtained automatically. Upon leaving the conveyor roller 34, the band-shaped element 17 enters the stretching zone between the conveyor rollers 34 and 35, where the band-shaped element 17 or, more precisely, the rubber-like flat band 21 is stretched by p percent to $(1+p/100)$ times its original length due to the greater speed $n(1+p/100)$ of the conveyor roller 35 as compared to the speed n of the conveyor roller 34, and with this increase of the length of the rubber-like flat band 21, i.e. of the band-shaped element 17 by p percent to $(1+p/100)$ times its original length upon entering said stretching zone the speed of the band-shaped element 17 also jumps suddenly by p percent to $(1+p/100)$ times its speed before reaching the conveyor roller 34 and thereby approximately to $(1+p/100)$ times the speed at which the cable 1 is produced. The band-shaped element 17 passes the roller 37 shown in longitudinal cross-section in the sectional plane 4—4 in FIG. 4 at that speed, and there the band-shaped element 17 is imparted a convex configuration with the upper side of the band convex to the outside as a result of the outwardly convex configuration of the running surface 38, thereby causing the fixed link rails 23 which are connected to the band-shaped element 17 to be bent up towards the inside with their rail underside, which in turn causes the fixed links 9 of each adjoining pair on these fixed link rails 23 to spread apart from each other as shown in FIG. 1c until the small tubes 10 within which the optical fibers 8 are running can be inserted without difficulty between each pair of adjoining fixed links 9. In Order to ensure the unhindered insertion of the small tubes 10 between each pair of adjoining fixed links 9, the diameter of the small tubes 10 is appropriately sized so that the small tubes 10 inserted between adjoining and spread-out fixed links 9 barely touch the two lateral walls of each pair of adjoining fixed links 9 and the convexly curved bridges 24 between each pair of adjoining fixed links 9 after they have been inserted. In view of the fact that during the insertion of the small tubes 10 the openings between each pair of adjoining fixed links 9 into which the small tubes 10 are to be inserted must be located exactly underneath the small tubes 10, i.e. not laterally offset with respect to said small tubes 10, the unhindered insertion of said small tubes 10 between each pair of adjoining fixed links 9 is ensured through the fact that on the one hand the fixed link rails 23 are wavy on their rail underside because of the earlier-described manner of their manufacture, whereby the band-shaped element 17 is also wavy on its underside in the areas of the installed fixed link rails 23 as shown in FIG. 4 and that on the other hand the running surface 38 of the roller 37 is wavy transversely to the direction of movement, with wave troughs 39 in the area of the fixed links 9 and with wave peaks 40 in the area of the bridges 24 between the two fixed links 9, so that lateral shifting of the openings between the two fixed links 9 of each adjoining pair with respect to the small tubes 10 to be inserted into these openings is totally prevented because of the precise manner in which the waviness on the underside of the band-shaped element 17 in the areas of the installed fixed link rails 23 on the one hand fits together with the running surface 38 of the runner 37 on the other hand, and because of the longitudinal tension occurring in said stretching zone in the band-shaped element 17, or more precisely in the rubber-like flat band 21 which presses the band-shaped element 17 upon the running surface 38 of the runner 37 and thereby presses the wavy underside of the band-shaped element 17 in the areas of the installed fixed link rails 23 firmly into the wave troughs 39 of the identically wavy running surface 38 on the roller 37. Furthermore, the tapering of the fixed links 9 on their upper side, as shown in FIGS. 4 and 1a, provides additional security insofar as unhindered insertion of the small tubes 10 between each pair of adjoining fixed links 9 can be ensured. The insertion of the small tubes 10 between each pair of adjoining fixed links 9 takes place, or more precisely is just completed, when the band-shaped element 17 which is now equipped with small tubes 10 and thus constitutes band 7 leaves the roller 37 tangentially. This has the advantage that the small tubes 10 are not bent up to the area situated between the roller 37 and the conveyor roller 35 in which they are then clamped fast between the fixed links 9 for reasons to be explained in greater detail further below, and this is of great importance for precise measuring of the percentile extendibility of cable 1 in relation to the optical fibers 8 by p percent, and especially also for protecting the optical fibers 8 from axial tension loads already during the manufacture of the cable. The small tubes 10 to be inserted between each pair of adjoining fixed links 9 are extruded by the extruder 18 around the optical fibers 8 which go into these small tubes 10 at an extrusion speed equal to the increased speed of the band-shaped element 17 of band 7 in said stretching zone and which is approximately $(1+p/100)$ times the speed at which the cable 1 is being produced. The optical fibers 8 arriving into these small tubes 10, i.e. into the corresponding openings in extruder 18 at the same increased speed are delivered by means such as a block 19 for the continuous delivery of the fibers 8, here in form of the fiber roll 20 indicated by broken lines within block 19, this with practically no axial tension load acting upon the fibers 8, whereby the fiber rolls 20 are driven in this case for this purpose and whereby this driving force is set to a tension serving as the regulating criterium of a very low set point. This setting automatically results in a delivery speed of the optical fibers 8 by means 19 which is approximately (1+p/100) times the speed of production of cable 1. In principle, the means 19 can of course also be the means for the production of the optical fibers 8 at the named delivery speed, but this is a purely theoretical possibility at this time, because the optical fibers must still be subjected to quality control after being produced, and unsuitable fibers must be sorted out, so that this possibility could be implemented only if such an improvement of the production methods could be achieved that quality control would become superfluous, and in that case it would be basically recommended to design the means 19 in the form of storage means, e.g. in form of the fiber rolls 20 indicated by broken lines, that is to say as roll storage units, or also in form of the known standing fiber spools, similar to the known wire spools, from which the fibers can be pulled off with practically no tension load and whereby no drive and therefore no connected regulating device is required, but whereby the undesirable torsion of the fibers, each by 360°, would often occur along a fiber length equal to the length of a spool loop of such a spool. In connection with the roller 37 shown in FIG. 1, it should furthermore be pointed out that in order to avoid the differences in running speeds, no longer negligible, between the central portion of running surface 38 which has a somewhat greater diameter because of the outward convex configuration of said running surface 38 and the outer portion of running surface 38 with a somewhat smaller diameter, the roller diameter of runner 37 is considerably greater than this differences in diameters, and must suitably be at least 100 times, but preferably 250 to 1000 times this difference of diameters and that accordingly the roller diameter of roller 37 would have to be at least 5 times, preferably however 10 to 50 times the width of the roller in a drawing nearly true to scale, so that the roller diameter of roller 37 is shown at a greatly reduced scale than the other dimensions shown, especially by comparison with the roller width and the shown dimensions of the band-shaped element 17 or of band 7. This also applies for the same reasons to the two conveyor rollers 34 and 35 and to the deflection roller 36. Furthermore, the path over which the band-shaped element 17 or band 7 moves freely between the welding stations 31 and roller 34 as well as between rollers 34 and 37, rollers 37 and 35 and rollers 35 and 36 and between roller 36 and the admission hopper 14 should be shown comparatively much larger than is the case in FIG. 1, and be for example three to ten times the roller diameter of rollers 34 to 37, because along each of these paths, with the exception of the path between rollers 35 and 36, a change in the convex configuration of the band-shaped element 17 or of band 7 takes place, specifically a transition from a non-convex configuration to a convex configuration of the underside of the band between the welding station 31 and roller 34, a transition from a convex configuration into a concave configuration of the underside of the band between rollers 37 and 35, and a transition from a slightly to a strongly convex configuration of the underside of the band between roller 36 and the admission hopper 14, and because the change of convex configuration per path unit should be as small as possible to avoid subjecting the edges of the rubber-like flat band 21 to excessive loads. Because of the transition of band 7, after it leaves roller 37, on the path between rollers 37 and 35, from a concave to a concave configuration of its band underside, the degree of spread between adjoining fixed rails 9 of each such pair which is prompted by the outwardly convex running surface 38 of roller 37 to allow unhindered insertion of the small tubes 10 between each pair of adjoining fixed links 9 is at first reversed along the first half of the path between rollers 37 and 35, whereupon the fixed link rails 23 are somewhat bent together along the second half of the path between rollers 37 and 35, so that the upper sides of each of a pair of adjoining fixed links 9 move close to each other, whereby the convex configuration of the bridges 24 between each pair of adjoining fixed links 9 which occurs when two adjoining fixed links 9 are spread apart disappears at first along the first half of the path between rollers 37 and 35 and whereby this causes the distance between the walls of each pair of adjoining fixed links 9 facing each other to be somewhat increased at the height of the bridges 24 so that the decrease of the distance between these walls of two adjoining fixed links 9 facing each other increases somewhat at the height of the fixed links 9, whereby the decrease of the distance between these walls at approximately half the height of fixed links 9, resulting from the reversal of the degree to which adjoining fixed links 9 are spread apart, simultaneously with the disappearance of the convex configuration of the bridges 24, is compensated so that first of all no clamping of the small tubes 10 between adjoining fixed links 9 occurs in the first half of the path between the rollers 37 and 35 and whereby a further decrease of distance between the walls of adjoining fixed links 9 facing each other results at approximately half the height of the fixed links, whereby said decrease of distance does nevertheless not at first result in a clamping of the small tubes 10 between the fixed links 9 because the small tubes 10 which are pushed down towards the bridge 24 by these walls due to the latters' inclination in relation to each other can at first still escape in a downward direction due to the disappearance of the convex configuration of the bridges 24 and due to the beginning concave configuration of these bridges, so that clamping of the small tubes 10 between each pair of adjoining fixed links 9 only occurs in the final zone of the path between rollers 37 and 35, when the small tubes 10 which have first escaped downward, come to lie on the bridges 24 and can no longer escape in a downward direction. It is important for the clamping of the small tubes 10 between adjoining fixed links 9 to occur only in the final zone of the path between rollers 37 and 35 and is still weak at the end of this path as well as when subsequently passing the conveyor roller 35 for the reason that the adjoining fixed links 9 come closer together during wrapping of the band 7 around the inner pipe, as shown in cross-section of the cable 1 in FIG. 1a, and that the clamping of the small tubes 10 occurring at that point would be too strong if a clamping of the small tubes 10 between two adjoining fixed links 9 were to result as early as in the beginning zone of the path between the rollers 37 and 35 and because the clamping of the small tubes 10 in the final zone of this path would already be relatively strong. On the other hand however, it is not possible to dispense entirely with the clamping of the small tubes 10 between the adjoining fixed links 9 of each pair at the end of the path between the rollers 37 and 35 as well as when passing the conveyor roller 35 in favor of weaker clamping of the small tubes 10 between each pair of adjoining links 9 in the completed cable 1 because the small tubes 10 would be displaced in relation to the fixed link rails 23 without such clamping after leaving the conveyor roller 35 when the band 7 is pulled together and when they are thus caused to change from a straight-line course to a wavy course, whereby a uniform, wavy course of the small tubes 10 along band 7, with waves of all small tubes 10 being of identical size between each pair of sequential fixed link rails 23 and with the waves of identical size of each individual small tubes 10 along the band 7, as shown in FIG. 1g for example, would no longer be ensured. For this reason an optimal solution consists only in a clamping of the small tubes 10 between each pair of adjoining fixed links 9, as in the present case, which begins only in the end zone of the path between the rollers 37 and 35. In the middle of the path between rollers 37 and 35, where band 7 is practically without curvature over a certain length of the path as it changes from a concave to a convex configuration of its band underside there occurs the aspect as shown in the top view of the band 7, looking in direction VI as shown in FIG. 1f with small tubes 10 lying between the fixed links 9 and following a straight-line course and there is produced a distance l. $(1+p/100)$ between the fixed link rails 23 and $(1+p/100)$ times the wave length l of the wave-shaped course of the paths 12, resulting from a stretching of the band 7 or of the band-shaped element 17 within the stretching area located between the conveyor rollers 34 and 35 by p percent to $(1+p/100)$ times of its original length. This increased distance between the fixed link rails 23, and thereby of course also the stretching of band 7, is maintained during the passage of the conveyor roller 35 because the fingers 33 of the conveyor roller 35 which lie down over the band 7 which is running over the conveyor roller 35 and are thus driving the band 7 without any slippage must naturally have the same distance between each other in the circumferential sense of the conveyor roller 35 as the fixed link rails 23 arriving one after the other at the conveyor roller 35 so that each of the fingers 33 so that the fingers 33 may be able to lie directly behind the arriving fixed link rails 23, i.e. behind the rails 9 of same, and since the fingers 33 are rigidly connected to the conveyor roller 35, said increased distance between the fixed link rails 23 when band 7 arrives at the conveyor roller 35 must also be maintained for as long as band 7 runs over conveyor roller 35. In this case a difference in the configuration between conveyor rollers 34 and 35 results, because while in conveyor roller 34 and in circumferential direction the fingers 33 must be at a distance from each other that is equal to the distance between the fixed link rails 23 of the band-shaped element 17 equipped with them as it passes the conveyor roller 34 and must thereby be equal to the wave length l of the wavy course of paths 12, the fingers 33 of the conveyor roller 35 must, in the circumferential direction, for the above-mentioned reasons be at a distance from each other which is equal to said increased distance between the fixed link rails 23 as they arrive at the conveyor roller 35 equal to $(1+p/100)$ times the wave length l of the wave-shaped course of the paths 12. Thus, when as in the present embodiment given as an example, fingers are provided at the two conveyor rollers 35 and 34 to prevent slippage of band 7 or of the band-shaped element 17 in relation to the conveyor rollers, the relationship between the azimuthal distance between fingers 33 at the conveyor roller 35 and the azimuthal distance between the fingers at the conveyor roller 34, and with it of course also the relationship between the speed $n(1+p/100)$ of conveyor roller 35 and the rotational speed n of conveyor roller 34 is fixed at the unchangeable value $(1+p/100)$ because of the rigid connection between fingers and conveyor rollers, so that the above mentioned possibility of varying in a simple manner the path length of a wavy path course and thereby the relationship between it and the cable length, i.e. the admissible percentile extendibility of the cable by merely changing the relationship of the speeds of two conveyor rollers effecting the stretching of the band does not exist in the embodiment of a device for the production of the cable according to invention as shown in FIG. 1. When this possibility is desired, the fingers 33 must be omitted at the conveyor roller 35 and in their stead, to avoid slippage between band 7 and conveyor roller 35, other measures must be taken, such as for example providing an endless running belt stretched over band 7 and running with it which pushes said band 7 against the conveyor roller 35 and thereby presses the fixed links 9 of band 7 against the conveyor roller 35, whereby transversal ribbing of the running surface of conveyor belt 35 may be provided additionally. The conveyor roller 35 and thereby the band 7 running across it is driven by means of motor 48 shown in FIG. 5 and drawn schematically as a block which can be an electrical machine wired as a motor in this case, just as the earlier-mentioned controllable brake at the conveyor roller 34 can be an electrical machine wired as a generator. In this case identical machines can be used advantageously for the motor 48 at the conveyor roller 35 and for the brake at the conveyor roller 34, and the generator current supplied by the rotor of the machine wired as a generator can be fed as driving current to the rotor of the machine wired as a motor, whereby the braking power of the machine wired as a generator and consequently its speed is also controlled by controlling its field current and whereby the speed of the machine wired as a motor and consequently its required power is also controlled by a corresponding adjustment of the field current of the machine wired as a motor. The advantage of such a machine aggregate resides in the fact that by means of the above-mentioned device for the control of braking power and therefore of the speed of the machine wired as a generator, using the longitudinal tension of the band-shaped element 17 before it reaches the conveyor roller 34 as regulating criterium, it is also possible to control simultaneously the speed and with it the required power of the machine wired as a motor, whereby this regulating device is used to regulate the field current of the machine wired as a generator as well as the field current of the machine wired as a motor, and whereby in the present instance a fixed predetermined relationship can be established between the speeds $n(1+p/100)$ and n of the two conveyor rollers 35 and 34 and, in case of the above-mentioned second possibility of a changeable ratio of speeds of the two conveyor rollers, for example by means of a variable resistor, an adjustable ratio of the field currents of the two machines. It is a further advantage of such a machine aggregate that the braking power of the machine wired as a generator is used as part of the required power of the machine wired as a motor and therefore does not have to be converted into heat by voluminous variable resistors which are especially slow to adjust and are not continuously adjustable so that with such a machine aggregate a non-delayed and continuous and therefore much more precise regulation can be effected than when the braking power of the machine wired as a generator is converted into heat. When band 7 leaves the conveyor roller 35 it goes from said stretching zone into a zone of band 7 with very low longitudinal tension. This low longitudinal tension is produced by a spring suspension with relatively weak draw springs 49 of the deflection roller 36 over which band 7 runs and which is shown only schematically in FIG. 1, whereby the line of application of said draw springs coincides with the angle-bisecting line between band 7 running towards roller 36 and band 7 running away from same, whereby the own weight of roller 36 and the gravity resulting therefrom is lifted by a pendulum suspension of roller 36 (not shown in FIG. 1). Instead of such a combination of a pendulum suspension of roller 36 and of the spring suspension by two draw springs 49 on either side of roller 36 indicated schematically in FIG. 1 it is also possible to provide a support of roller 36 on a slightly inclined slide, whereby the gravity components of roller 36 which are parallel to the slide take the place of the traction of the draw springs 49 and whereby the gravity components of roller 36 which are perpendicular to the slide are cancelled out by the slide which replaces the pendulum suspension at this point. In this sense, a support of roller 36 on a horizontal slide in combination with draw springs 49 with a horizontal line of application would also be possible. With the above-mentioned passage of band 7 as it leaves conveyor roller 35 from said stretching zone into a zone of very low longitudinal tension of band 7, said band 7, or the rubber like flat band 21 constituting a portion of said band 7, retracts within the stretching zone to $(1+p/100)$ times its original length, by p percent, to its original length, whereby the speed of band 7 or of rubber-like flat band 21 simultaneously returns with a jump of p percent to the speed of the rubber-like flat band 21 before it reaches conveyor roller 34, and thus to the production speed of cable 1, a speed which band 7 maintains thereafter until it is incorporated into cable 1, i.e. until band 7 is wrapped around the inner pipe 6 and which it then maintains inside the completed cable 1. When band 7 contracts as it leaves the conveyor roller 35, the intervals between the fixed link rails 23 on band 7 are also reduced from $(1+p/100)$ times the wave length l of the wave-shaped course of the paths 12 to said wave length l, and thereby the small tubes 10 and the optical fibers 8 running within them which are clamped fast between each pair of adjoining fixed links 9 of these fixed link rails 23 are forced to change from their straight course within said stretching zone (see FIG. 7) to a wavy course. As they thus change from a straight course to a wavy course, the small tubes 10 could now well up in any direction in which they are not hindered by band 7 or the rubber-like flat band 21, e.g. in the direction shown in FIG. 8, with waves towards one side of band 7 or in the opposite direction, with waves towards the other side of band 7 or also with waves lifting up from band 7 or rubber-like flat band 21, whereby it would be possible in principle for each individual small tube 10 between two fixed link rails 23 in a row to go into another direction than any other small tubes 10 between these two fixed link rails 23; to prevent this from happening and to ensure that all of the small tubes 10 well up in the same direction, essentially parallel to path 7, as shown in FIG. 8, the sheet-metal guides 50 and 51 are provided along the entire path between conveyor roller 35 and deflection roller 36, or at least along a beginning zone of this path, with band 7 running between them, and an air current produced by a blower (not shown in FIG. 1) is directed between them perpendicularly to the running direction of band 7 and essentially parallel to the sheet-metal guides 50 and 51, by means of which the welling up of all the small tubes 10 is guided into one and the same direction, i.e. the direction of the air current. The air current is directed perpendicularly to the plane of the drawing paper and upon said drawing paper in the device shown in FIG. 1. To prevent the small tubes 10 or some of them to lift up from band 7 or flat band 21 after passing the air current and thus assume a waviness which is no longer parallel to band 7, the sheet metal guide 51 can be extended beyond its length shown in FIG. 1 and can be guided over deflection roller 36 up to the admission hopper 14 where it can then go into a second, internal admission hopper, coaxial with the admission hopper 14, ending at a short distance from the inner pipe. The band 7 leaving conveyor roller 35 has, as can be seen from the cross-section in sectional plane 5—5 through the conveyor roller 35 in FIG. 1, a convex configuration on its band underside directed to the outside, and this convex configuration of band 7 is maintained all along the path between the conveyor roller 35 and the deflection roller 36 because the running surface 42 of the deflection roller 36, as can be seen from the cross-section in the cross-sectional plane 6—6 through the deflection roller 36 according to FIG. 1e is given a concave configuration to the same extent to which the running surface 41 of the conveyor roller 35 is convex in its configuration, so that the same convex configuration results on the band underside of band 7 as it passes the deflection roller 36, where the band underside faces inward, than when passing the conveyor roller 35 where the band underside lies on the outside. This constant convex configuration of the band 7 as it passes the conveyor roller 35 and then on the path between rollers 35 and 36 as well as when passing the deflection roller 36 is necessary to keep the small tubes 10 clamped in between each pair of adjoining fixed links 9 as required for the reasons mentioned earlier. In adaptation to this convex configuration of band 7 along the path between the rollers 35 and 36, the sheet-metal guides 50 and 51 between which band 7 runs are also correspondingly convex so that the small tubes 10 can essentially well up only at a parallel to band 7, and this applies of course also to the above-mentioned, possible extension of the sheet metal guide 51 beyond its length as shown in FIG. 1. In the end zone of the path between rollers 35 and 36 occurs the aspect as shown in FIG. 8, in the top view of band 7, looking in direction 8, with small tubes 10 taking a wavy course between the fixed links 9 and with a distance between fixed link rails 23 equal to the wave length l of the wavy course of paths 12, and in this form the now completed band 7 passes the deflection roller 36 and then runs into the admission hopper 14 where it is imparted an ever more concave configuration as it approaches the bottom of the hopper to be wrapped around the inner pipe 6 of the cable 1. The longitudinal tension of band 7 on the path between deflection roller 36 and admission hopper 14, and therefore the band speed along this path is also equal to the speed on the path between rollers 35 and 36 because of the arrangement of the draw springs 49 shown in FIG. 1, with an angle-bisecting line of application between band 7 running towards roller 36 and band 7 running away from it. Upon reaching the bottom of the admission hopper 14, band 7 is wrapped completely around the inner pipe 6 and is then led on to extruder 15 by the connected, cylindrical part of the admission hopper 14, said extruder 15 extruding the outer pipe 16 around this band 7 which is wrapped around the inner pipe 6, thus completing cable 1.

Figure 2:
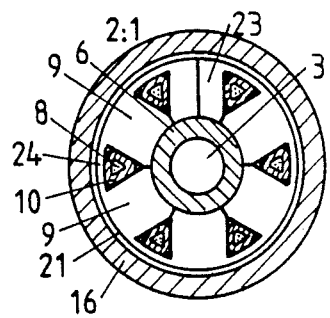
FIG. 2 is a cross-section through a cable produced by means of the device according to FIG. 1, at the cross-sectional plane 2—2 of FIG. 1 at an enlarged scale (2:1).

In the completed cable, which is shown in cross-section in the sectional plane 2—2 in FIG. 2, the space between the outer pipe 16 and the inner pipe 6 constitutes the cylinder-jacket-shaped shell (13) within which band 7 is located on paths 12, together with the fixed links 9, with the fixed link rails 23 and the small tubes 10 as guidance means for the optical fibers 8, said paths assuming an essentially wavy course with excursions 52 in the circumferential direction of the cylinder-jacket-shaped shell (13) in relation to median lines 11 assigned to each, located inside the cylinder-jacket-shaped shell (13) and which are essentially parallel to the cylinder axis 53 of shell 13 which coincides with the axis of cable 1. At the same time all of the paths 12 located in the cylinder-jacket-shaped shell (13) have maximum excursions 52 of equal size in the circumferential direction of the cylinder-jacket-shaped shell (13) in relation to the assigned median lines 11 and the points of intersection 54 between the paths 12 located in the cylinder-jacket-shaped shell (13) with each respectively assigned median line 11 are situated in the cross-sectional planes of the cylinder-jacket-shaped shell (13) which are identical for all paths 12, whereby the path inclinations in each of these cross-sectional planes with respect to the median lines assigned to each are equal in extent and direction for all. In cable 1 the paths run inside the inner cavity of the small tubes 10. The small tubes 10 are located with their waves or wave-shaped course inside cavities 55 in the form of cylinder jackets which are bounded on the inside by pipe 6 and on the outside by pipe 16 and laterally on either side by two sequential fixed link rails 23, and are capable of free movement within these cavities because the diameter of the small tubes 10 is considerably smaller than the distance between the outer wall of the inner pipe 6 and the inner wall of the outer pipe 16. Since the outer pipe 16 is supported on the inner pipe 6 through the fixed links 9, this capability of free movement of the small tubes 10 within the cavities 55 is also maintained at the curvatures of cable 1 where curvatures are extreme, because a curvature of cable 1 so extreme as to reduce the distance between inner pipe 6 and outer pipe 16 down to values below the diameter of the small tubes 10 so that the free movement of the small tubes 10 within the cavities 55 would be impaired is practically impossible because, in the case under discussion, the curvature radius of cable 1 at the point of curvature would have to be smaller than the cable diameter, and such extreme curvature of cable 1 is out of the question for a number of other reasons. Since the capability of free movement of the small tubes 10 within the cavities 55 thus remains ensured practically under all possible circumstances, the amplitude of the wavy course of the small tubes 10 is increased on the inside of the curvature and decreased on the outside of the curvature at a point of curvature of cable 1, and in case of temperature changes in cable 1 the amplitude of the wavy course of small tubes 10 increases when temperatures fall and decreases when they rise. This change in amplitude of the wavy course of the small tubes 10 with temperature changes in cable 1 occur due to the fact that temperature changes and thereby resulting changes in the length of cable 1 cause changes in the distance between the fixed link rails 23 mechanically coupled to the inner pipe 6 and those mechanically coupled to the outer pipe 16.

The percentile extendibility of cable 1, is to be calculated with $p = 10\%$ so that a wavy course of the small tubes 10 is still obtained, i.e. the amplitude of this wavy course does not yet become zero at the highest admissible temperature of cable 1 at points of curvature of cable 1, with the strongest admissible curvature of cable 1 on the outside of the curvature, so that a reserve still exists even under these unfavorable conditions before the occurrence of an axial tension load acting upon the optical fibers 8 and thus putting them in danger of breaking. The wavy course of the small tubes 10 is essentially sinus-shaped in cable 1, whereby the small tubes 10 pass the fixed link rails 23 in the minima of this sinus curve and are clamped fast at that point between each pair of adjoining fixed links 9. The small tubes 10 themselves consist of a soft, elastic material and therefore oppose practically no resistance to any movement within the cavities 55. The thermal expansion coefficient of this material is somewhat greater than that of the optical fibers 8. The wall thickness of small tubes 10 is calculated so that said small tubes 10, as they pass the fixed link rails 23, have approximately the essentially triangular cross-sectional form shown in FIG. 2 without forming folds and lifting off partially from the lateral walls of the fixed links 9 and so that on the other hand, inside small tubes 10, also in the areas where said small tubes 10 pass the fixed link rails 23, there still remains sufficient room for free movement of the optical fibers 8. Finally, with reference to the cable 1 shown in FIG. 1, it should be pointed out that one or several additional bands such as band 7, basically having the same composition as that which is shown in FIG. 1, can be wrapped around the outer pipe 16 of cable 1 in steps, each such band being then enclosed within an additional outer pipe, whereby the outer pipe of each band then constitutes the inner pipe for the next band, so that cable 1 can also be provided with a plurality of cylinder-jacket-shaped shells enclosing each other, such as cylinder-jacket-shaped shell 13.

In conclusion, the following should be pointed out with reference to the designation and concepts used: The distance between fixed link rails 23, as can be seen from FIGS. 7 and 8 among others, is to be understood as being the distance between the centers of the fixed link rails. The height of fixed links 9 is here to be understood as being the height which comprises the thickness of the flat band 21 connected to the fixed link rails 23 at rail center, as indicated by FIG. 1a and by the descriptions to this effect, so that FIG. 1a for example shows a height of fixed links 9 which is equal to the distance between the outer wall of the inner pipe 6 and the inner wall of the outer pipe 16. The concept "welding" and the designations and concepts derived from it here mean generally an intimate bonding of the undersides of the fixed link rails 23 to the flat band 21 and does not necessarily imply a melting process at these bonding zones. Such intimate bonding could very well be created also by moistening the undersides of the fixed link rails 23 with a solvent before installing them on the flat band 21, in which the material of the fixed link rails 23 as well as the material of the flat band 21 dissolve, and the "plastic welding device" 31 could then cause the dissolved surface layers of the two materials to flow into each other as a result of high-frequency heating and at the same time evaporate any excess solvent. Also the utilization of the so-called quick-bonding means, often designated by the term "welding adhesive" could be taken into consideration to create such intimate bonding. Finally, the term "extruder" here designates all devices which are required for the production of the desired extrudate. When for instance the rubber-like flat band 21 is made of an elastomer plastic which must actually be heat-treated, i.e. cured after extrusion in order to attain its rubber-like properties, the term "extruder 22" is to be understood as meaning that block 22, in addition to the extrusion means, also comprises the device for the required heat treatment, and this applies also to the other extruders, in particular also to extruder 18 by means of which the elastic small tubes 10 are produced. In connection with the term "rubber-like" it should be pointed out here that this term refers to the physical properties of the flat band thus described, i.e. that the flat band can be stretched longitudinally and that this stretching can be reversed once more after elimination of the traction which causes the stretching, either because of the elastic properties of the "rubber-like" flat band or because of special measures taken to achieve shrinking of the stretched flat band through the utilization of an appropriate, shrinkable material for said flat band. The term "rubber-like" does not therefore limit the material of the flat band thus designated to materials which are considered as being chemically rubber.

I claim:

1. A cable for the transmission of data with the aid of optical fibers for signal transmission by means of electromagnetic radiations which propagate along said fibers, comprising, at least one cylinder-jacket-shaped shell having a central longitudinal axis, a plurality of paths formed in the interior of said shell, and guidance means for guiding the optical fibers in said paths, said paths extending in the longitudinal direction of the cable substantially in the form of waves having excursions in the circumferential direction of said shell in relation to median lines within said shell substantially parallel to said axis of said shell, said guidance means serving to fix the azimuthal positions of said paths at certain locations spaced apart from each other in the longitudinal direction of the cable, the maximum distance between said certain locations being the length of the fibers between said locations, whereby said paths essentially being freely movable in the azimuthal direction between said certain locations as long as said distance is below said maximum.

2. Cable as in claim 1, characterized in that all paths located in one and the same cylinder-jacket-shaped shell (52) follow uniformly-sized maximum excursions (52) in the circumferential direction of the cylinder-jacket-shaped shell in relation to the respectively assigned, imaginary median lines and in that the points of intersection of the paths inside this cylinder-jacket-shaped shell with the imaginary median line attributed to each are located in the cross-sectional planes, identical for all of the paths, of the cylinder-jacket-shaped shell and in that the path inclination with respect to the median line attributed to each is uniform for all path inclinations as to degree and orientation in all of these cross-sectional planes and for all paths.

3. Cable as in claim 1, characterized in that the paths are constituted by equally long and equally bent path sections in the form of arcs of circles following each other, in at least one of the cylinder-jacket-shaped shells for the obtention of a minimal path curvature which remains constant in degree throughout the entire path length, each of these path curves being in the shape of a half wave of the wave-shaped path, and in that the centering angle of the individual arc-of-circle path sections, each of which constitutes a half wave of the wave-shaped path is larger by a safety factor of at least 1.05 than $$362.3° \cdot \sqrt{1 - \sqrt{\frac{500 - p}{500 + 5p}}}$$

with a maximally possible elongation of p percent of the median line connecting the ends of the half wave.

4. Cable as in claim 1, characterized in that the paths (12) run sinus-shaped in at least one cylinder-jacket-shaped shell (13), and in that the ratio of the amplitude to the wave length of the sinus-shaped path course is larger by a safety factor of at least 1.1 than $$.15 \cdot \frac{100 + p}{100}.$$

$$\sqrt{1 - \frac{3}{2}\left(\frac{100}{100+p}\right)^2} + \sqrt{1 - \frac{3}{4}\left(\frac{100}{100+p}\right)^2} \ B.$$

with a maximally possible elongation of p percent of the median lines.

5. Cable as in claim 1, characterized in that each cylinder-jacket-shaped shell is bounded on its inside and on its outside by two essentially cylindrical pipes and in that fixed links are installed in the space between the outer wall of the inner pipe and the inner wall of the outer pipe, said fixed links being part of the guidance means and being located each between adjoining paths, extending transversely to the longitudinal direction of the cable, essentially in radial direction of the shell, and being connected to each other by connections between adjoining fixed links (9).

6. Cable as in claim 5, characterized in that each of the fixed links lying between adjoining paths also assumes an essentially wave-shaped course, as do the paths, in the longitudinal direction of the cable and in that the height of the fixed links, in one of the two circumferential directions with respect to the median line attributed to each, is equal to the distance between the outer wall of the inner pipe and the inner wall of the outer pipe and is smaller than this distance between inner and outer pipe in all other areas, and especially also in the areas of maximum excursion of the path in the other one of the two circumferential directions with respect to the attributed median line whereby the fixed link height in the longitudinal direction of the cable follows an essentially wave-shaped course around a median value which is less than the distance between the inner and the outer pipe, whereby the maximum values of this wave-shaped course of the fixed link height are situated in the areas of maximum path excursion into the one, mentioned circumferential directions of the two, while the minimum values of said course are situated in the areas of maximum path excursion in the other, mentioned circumferential direction with respect to the median line assigned to each.

7. Cable as in claim 5, characterized in that each of the fixed links lying between adjoining paths also assumes an essentially wave-shaped course, as do the paths, in the longitudinal direction of the cable and in that the height of the fixed links, over their entire length, is less than the distance between the outer wall of the inner pipe and the inner wall of the outer pipe in that the fixed links, in addition to their wave-shaped course dictated by the wave-shaped course of the paths, with excursions in the circumferential direction of the cylinder-jacket-shaped shell additionally assume such a wave-shaped course with excursions in radial direction of the shell that the fixed links rest with their inner side on the outer wall of the inner pipe in one of the two circumferential directions with respect to the median line attributed to each, and rest with their outer side on the inner wall of the outer pipe in the areas of maximum path excursion in the other one of the two circumferential directions with respect to the median line attributed to each, in that they center the inner and the outer pipe in relation to each other as a result of their intrinsic elasticity, whereby means are provided for the attainment of a minimal friction coefficient in the areas in which the fixed links rest on the outer wall of the inner pipe and on the inner wall of the outer pipe and whereby the connection between adjoining fixed links, in the areas in which said fixed links do not rest on the inner or outer pipe, are constituted by small cross-rods, connecting adjoining fixed links in a spoke-like manner, located near the outer wall of the inner pipe or near the inner wall of the outer pipe.

8. Cable as in claim 5, characterized in that fixed links are provided only the areas of maximum excursion of the paths in one of the two circumferential directions with respect to the attributed median line, each between adjoining paths, and in that the height of these fixed links is equal to the distance between the outer wall of the inner pipe and the inner wall of the outer pipe and in 9. Cable as in claim 1, characterized in that the wave length (l) of the wave-shaped course of the path lies within the range of 2 to 20 cm.

10. Cable as in claim 1, characterized in that the guidance means for the guidance of the fibers comprise small tubes within which the fibers run, and in that the small tubes extend along the paths.

11. Cable as in claim 8, wherein said fixed links are connected to each other in the longitudinal direction of the cable by a rubber-like band located near the inner wall of the outer pipe or near the outer wall of the inner pipe, said band extending in the longitudinal direction of said cable and including highly elastic material.

12. Cable as in claim 9, wherein the wave length of the wave-shaped course of the path lies within the range of 2 to 5 cm.

* * * * *